Jan. 9, 1945. C. T. ROGNE 2,366,755
HOLDER FOR CHALK LINES AND THE LIKE
Filed Nov. 10, 1943
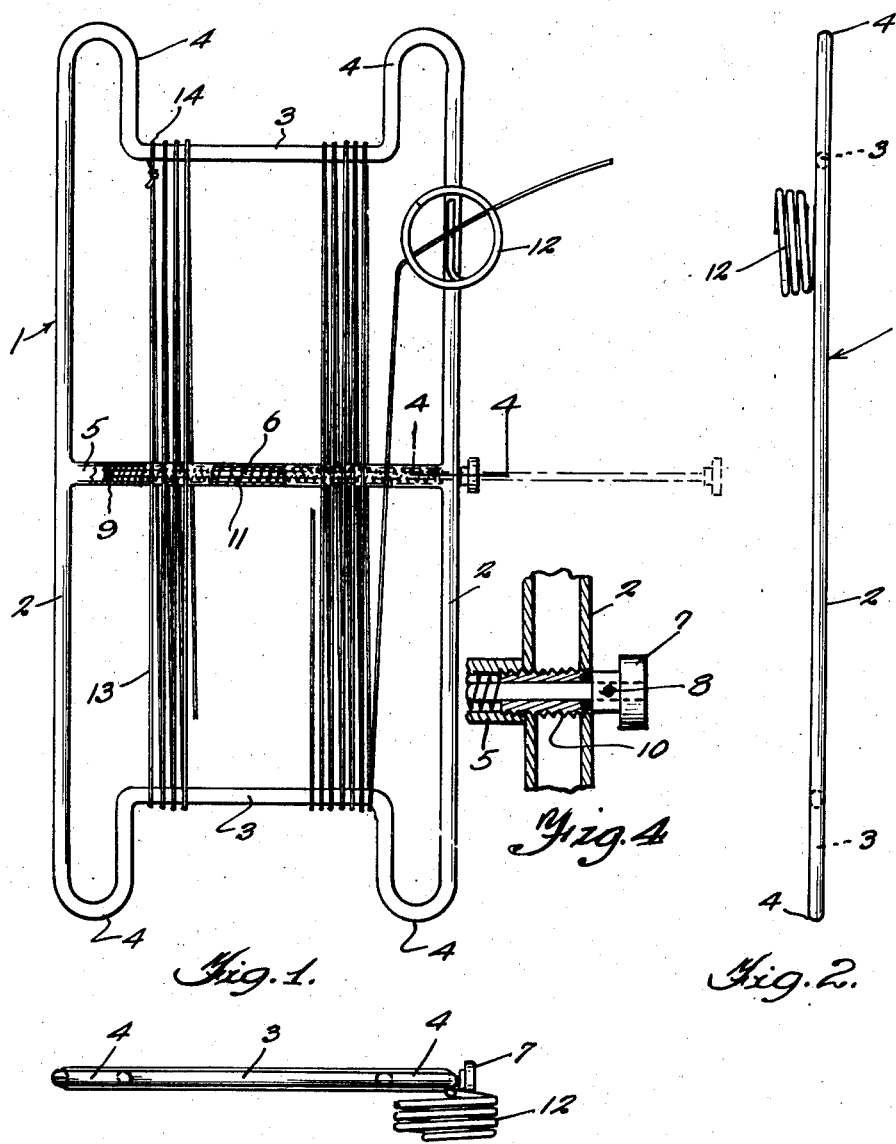
Inventor
CARL T. ROGNE Patented Jan. 9, 1945

2,366,755

UNITED STATES PATENT OFFICE 2,366,755

HOLDER FOR CHALK LINES AND THE LIKE

Carl T. Rogne, Milwaukee, Wis.

Application November 10, 1943, Serial No. 509,785

1 Claim. (Cl. 242—96)

My invention relates to improvements in line holders, the principal object in view being to provide a simply constructed, inexpensive holder for use in winding up carpenters' chalk lines, clothes lines, and the like, to keep the same from becoming tangled, frayed, or soiled, and which is easy to manipulate in unwinding and winding the line.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in front elevation of my improved holder in its preferred embodiment, Figure 2 is a view in side elevation, Figure 3 is a view in end elevation, and Figure 4 is a detail view in transverse section taken on the line 4—4 of Figure 1 and drawn to an enlarged scale.

Referring to the drawing by numerals, my improved holder, in its preferred embodiment, comprises an elongated, generally rectangular frame 1 of any suitable size and inexpensive rod-like material, and which embodies straight side bars 2, straight end bars 3 inset inwardly of the frame and connected to the side bars 2 by loop portions 4 forming guides, and a tubular transverse center bar 5 opening at one end through one side bar 2.

A rod-like spindle 6 is slidably and rotatably mounted in said center bar 5 to be slid inwardly and outwardly of said bar 5 and for rotation of the frame 1 about the spindle. The spindle 6 is provided with an outer end head 7 detachably fixed thereon by a pin 8, and a fixed collar 9 on its inner end. A suitable tubular screw plug 10 closes the open end of the center bar 5 and through which the spindle 6 extends. A coil spring 11 circumposed on said spindle between the collar 9 and plug 10 maintains the spindle retracted in said bar 5. On one side bar 2, adjacent one end of the frame 1, a coil spring 12 is suitably mounted with one of its ends attached to said bar.

The manner in which the described invention is used will be readily understood. The line 13 is tied, as at 14, to one of the end bars 3 and the remainder of the line wound on said bars between the loop 4. The end of the line is fastened in between the convolutions of the coil spring 12 by wedging said end in said convolutions. The spindle 4 may be pulled out of the center bar 5 and used as a handle about which the frame 1 may be revolved either in winding or unwinding the line. Obviously, the line 13 may be snubbed at any point in winding or unwinding by attaching the same in the coil spring 12.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A holder for winding up a line comprising an elongated, substantially rectangular frame of skeleton form including parallel side bars, parallel end bars inset toward the transverse center of the frame and adapted for winding of a line around the same, loops connecting the end bars to the side bars and forming guides between which the line may be wound, a tubular center bar extending between the side bars and having an end opening through one side bar, and a spindle slidably and rotatably mounted in said center bar for extension out of the same to form a handle about which the frame may be revolved, said spindle being spring-tensioned against extension out of said center bar.

CARL T. ROGNE.